United States Patent
Burton et al.

[11] Patent Number: 6,143,983
[45] Date of Patent: Nov. 7, 2000

[54] TWIST LOCK CONDUIT CONNECTOR GROMMET

[75] Inventors: Stephen J. Burton, Fenton; Michael T. Collins, St. Louis, both of Mo.

[73] Assignee: Emerson Electric Co., St. Louis, Mo.

[21] Appl. No.: 09/252,457

[22] Filed: Feb. 18, 1999

[51] Int. Cl.[7] .................................................. H02G 3/18
[52] U.S. Cl. ............................................................ 174/65 R
[58] Field of Search ............................... 174/65 R, 65 G, 174/151, 152 G, 153 G; 248/56; 16/2.1, 2.2

[56] References Cited

U.S. PATENT DOCUMENTS

| | | | |
|---|---|---|---|
| 3,893,719 | 7/1975 | Eidelberg et al. | 174/65 R X |
| 4,103,101 | 7/1978 | Maier . | |
| 4,302,035 | 11/1981 | Ochwat | 174/65 R X |
| 4,468,535 | 8/1984 | Law | 174/65 R |
| 4,494,779 | 1/1985 | Neff et al. | 174/65 R X |
| 4,831,213 | 5/1989 | Espevik et al. | 174/65 R |
| 5,132,493 | 7/1992 | Sheehan | 174/65 R |
| 5,285,013 | 2/1994 | Schnell et al. | 174/65 R |
| 5,519,273 | 5/1996 | Keck . | |
| 5,777,409 | 7/1998 | Keck . | |

*Primary Examiner*—Dean A. Reichard
*Attorney, Agent, or Firm*—Howell & Haferkamp, LC

[57] ABSTRACT

A grommet is attachable over an opening in an enclosure wall of an electrical device to protect electrical conductors passing through the opening. The grommet has a twist lock conduit connector that can be attached over an opening in the enclosure wall of the electrical device without the need for separate fasteners. The grommet protects the insulation of electrical conductors passing through the opening of the enclosure wall, seals the opening from its exterior environment, and provides a connection outside the enclosure wall for the attachment of a length of conduit through which the electrical conductors are passed.

20 Claims, 1 Drawing Sheet

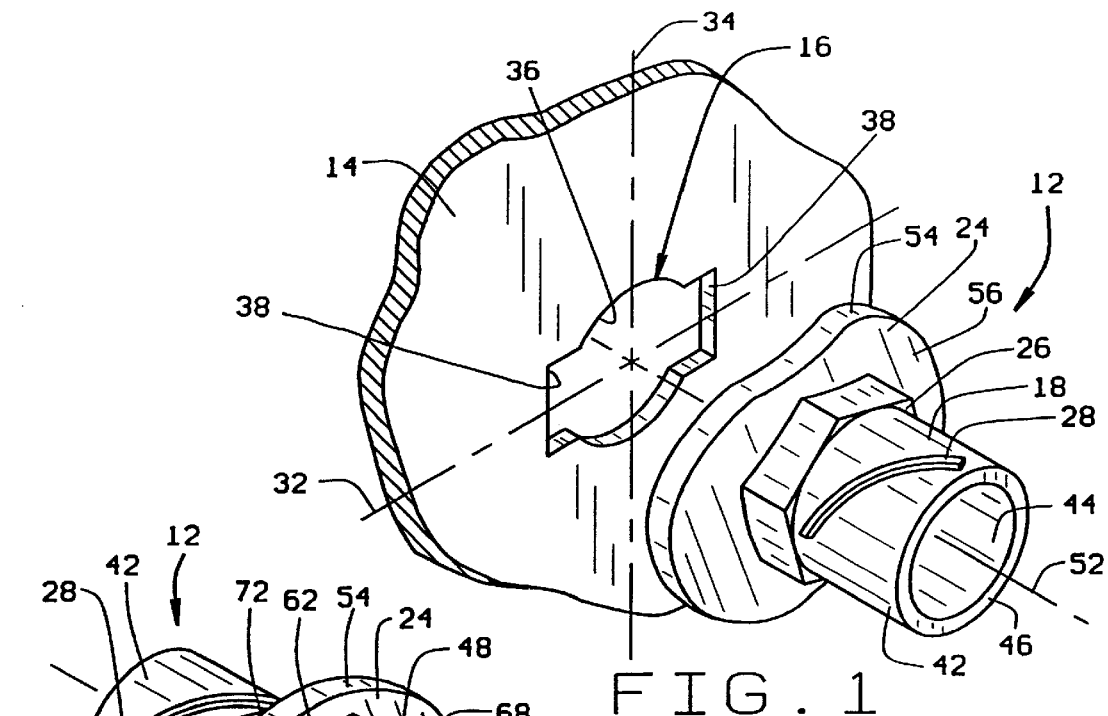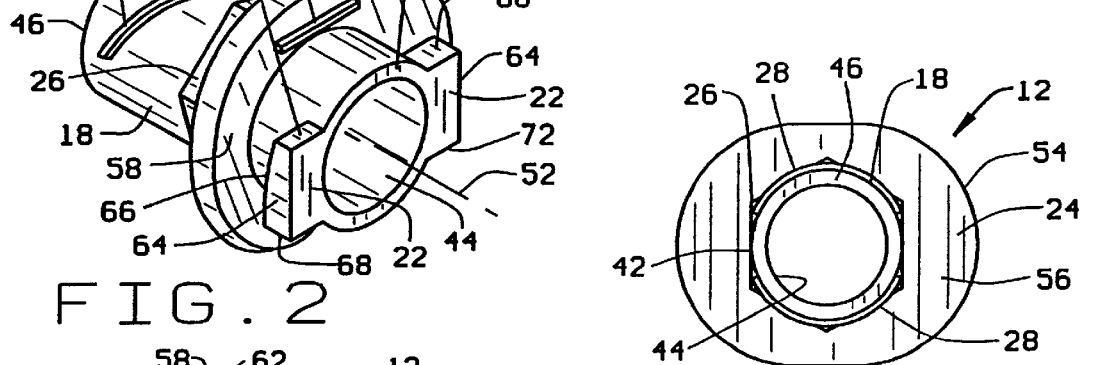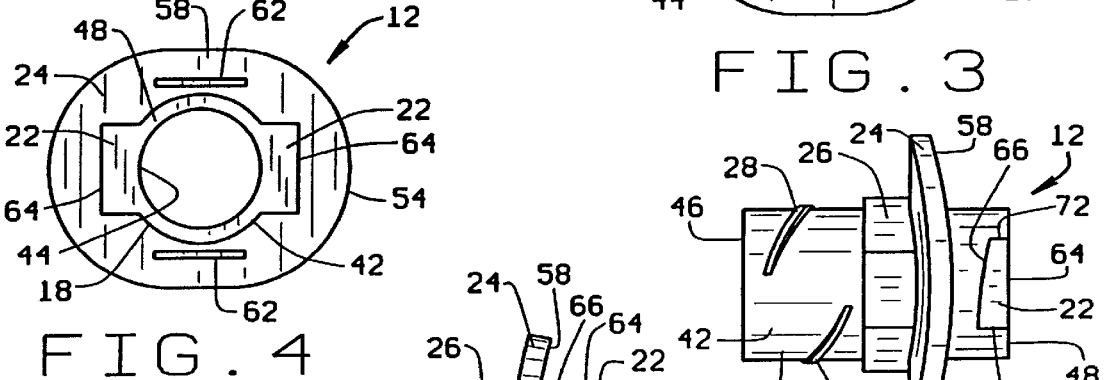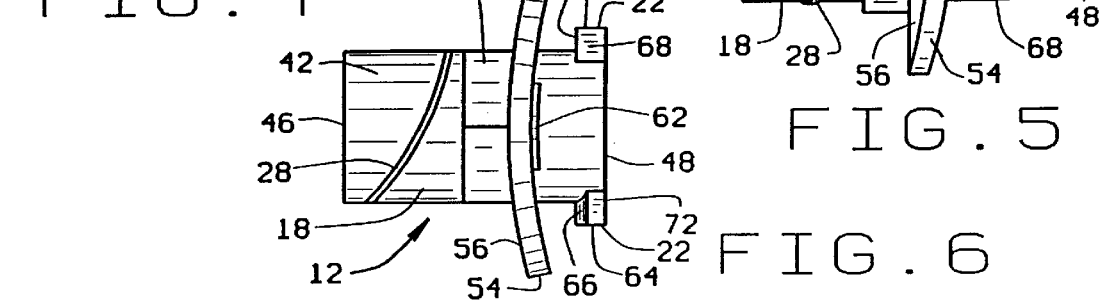

TWIST LOCK CONDUIT CONNECTOR GROMMET

BACKGROUND OF THE INVENTION (1) Field of the Invention

The present invention pertains to a conduit connector grommet that is attachable to an opening in an enclosure wall of an electrical device to protect electrical conductors passing through the opening. In particular, the present invention is directed to a twist lock conduit connector grommet that can be attached over an opening in the enclosure wall of an electrical device without the need for separate fasteners. The twist lock grommet protects the insulation of electrical conductors passing through the opening of the enclosure wall, seals the opening from its exterior environment, and provides a connection outside the enclosure wall for the attachment of a length of conduit through which the electrical conductors are passed.

(2) Description of the Related Art

For electrical devices contained in protective metal enclosures, for example electric motors or electric generators, the insulated electrical conductors of the devices typically pass through openings provided in the metal enclosure walls of the devices. In order to protect the insulation of the conductors of such a device from being scrapped or cut by an exposed edge of the opening in the metal enclosure wall, various different types of flexible grommets have been designed. The grommets often have a general circular shape and are press fit into the opening in the enclosure wall. The electrical conductors pass through the center of the grommet with the grommet protecting the insulation of the conductors from the metal edge of the enclosure wall.

Protective grommets of the above-described type were found to be disadvantaged where the electrical device is employed in an environment where it would be exposed to moisture, dust or dirt. The center hole of the grommet would protect the insulation of the electrical conductors from the metal edge of the enclosure wall, but would often not seal closed the opening through the enclosure wall. This would permit moisture, dust and/or dirt to enter the interior of the enclosure of the electrical device where it could detrimentally affect the performance of the electrical device.

To overcome this disadvantage, grommets were designed that had exterior walls that would extend a short distance outwardly from the periphery of the grommet and overlap the enclosure wall of the electrical device around the area of the opening in the wall provided for the electrical conductors. In addition, some grommets were provided with short lengths of conduit that projected outwardly from the grommet attachment to the enclosure wall. The insulated conductors of the electrical device would extend through the grommet conduit. A separate length of conduit, for example plastic or metal tubing, would then be attached over the exterior of the grommet conduit with the electrical conductors extending through the separate length of conduit. Together, the exterior wall of the grommet, the grommet conduit and the separate length of conduit would protect the insulation of the electrical conductors as they pass through the opening in the enclosure wall of the electronic device and would also seal the interior of the electronic device from any external contaminants. Examples of these types of grommets are disclosed in the U.S. Pat. No. 5,519,273 and U.S. Pat. No. 5,777,409.

However, protective grommets of the type disclosed in the above-referenced patents are limited in their use. Grommets of this type are specifically designed to be inserted in a notch formed in an enclosure wall at an interface between an edge of the enclosure wall and a separate portion of the enclosure of the electrical device, for example between the edge of a motor shell and an end shield attached to the shell. These grommets can not be attached to the notch in the enclosure if the end shield is already attached to the enclosure shell. It is necessary to first disassemble the end shield from the motor shell in order to access the notch provided for the grommet. Once the grommet is inserted in the notch and the electrical conductors passed through the grommet, then the end shield can be reassembled to the motor shell enclosure wall. Thus, this particular design of protective grommet requires that the grommet be positioned at an interface between two enclosure wall members and cannot be used other than at an edge of an enclosure wall.

To overcome the disadvantages of the prior art, a grommet design is needed that can be attached in an opening in an enclosure wall of an electrical device where the positioning of the opening is not limited to the interface of two wall sections of the electrical device, such as a motor shell wall and an end shield. The grommet would still provide the benefits of sealing the opening in the enclosure wall and would also provided a connection for a separate length of conduit to protect the electrical conductors extending from the electrical device.

SUMMARY OF THE INVENTION

The twist lock conduit connector grommet of the present invention is basically comprised of a tubular base having a sealing disk that extends outwardly from the exterior of the base and a pair of locking tabs at one end of the base. All of the component parts of the grommet are preferably formed as one piece from a rigid plastic material.

The grommet is designed to be easily attached to an opening in an enclosure wall by inserting an end of the grommet into the opening and then turning the grommet one-quarter turn. No separate fasteners are needed and it is not necessary that the opening in the enclosure wall be positioned at an edge of the wall as required by prior art grommets. The opening may be positioned at any convenient location in the enclosure wall that would facilitate the passage of the electrical conductors of the electrical device contained in the enclosure through the opening. In the preferred embodiment, the enclosure wall opening for the grommet has mutually perpendicular major and minor axes, with the major axis being larger than the minor axis. The opening has a circular center portion with rectangular notches formed in opposite sides of the center portion. The major axis is measured across the opening between the rectangular notches and the minor axis is measured perpendicular to the major axis across the circular portion of the opening.

The base portion of the grommet is tubular and has a generally cylindrical exterior surface. A cylindrical interior bore having a center axis passes through the base between a first end of the base and a second end of the base. The exterior diameter of the base is just slightly smaller than the interior diameter of the circular portion of the enclosure wall opening. The base has a pair of protrusions on its exterior surface adjacent its first end. The protrusions are formed as ridges that project outwardly from the base exterior surface and spiral a short distance across the exterior surface.

The disk extends around the base exterior surface between the opposite first and second ends of the base. The disk projects outwardly from the base to a peripheral edge of the disk. The exterior diameter of the disk peripheral edge is larger than the major axis dimension of the enclosure wall opening. The disk has a first surface that faces toward the first end of the base and an opposite second surface that faces toward the second end of the base. The disk is slightly curved so that its first surface is convex and its second surface is concave. A pair of protrusions project outwardly from the disk second surface and are positioned on diametrically opposite sides of the base second end.

A hex-nut is formed on the base by a plurality of flat surfaces arranged end-to-end around the base. The flat surfaces permit the use of a wrench on the flat surfaces when a mechanical advantage is needed to turn the grommet when connecting it in the opening of an enclosure wall.

The pair of tabs project outwardly from opposite sides of the base exterior surface at the second end of the base. Each tab has a surface that faces toward but is axially spaced from the second surface of the disk. Each tab surface has opposite first and second edges and the first edges are closer to the disk second surface than are the second edges. Thus, each tab surface tapers gradually toward the disk second surface as the tab surface extends from its second edge to its first edge. The axial spacing between the disk second surface and the first edge of each tab surface is slightly smaller than the thickness of the enclosure wall to which the grommet is to be attached, and the axial spacing between the disk second surface and the second edge of each tab surface is slightly larger than the thickness of the enclosure wall to which the grommet is to be attached. Each tab projects outwardly from the base exterior surface to distal ends of the tabs. The distal ends of the pair of tabs are spaced a distance apart that is smaller than the major axis dimension of the enclosure wall opening but is larger than the minor axis dimension of the enclosure wall opening.

In attaching the grommet to the enclosure wall opening, it is first positioned with its second end adjacent the opening and with its pair of tabs aligned with the major axis of the opening. The second end of the grommet is then inserted through the circular portion of the opening with the tabs of the grommet passing through the rectangular notches at the opposite sides of the opening. When the enclosure wall has a slight curvature, for example in a cylindrical enclosure wall of an electric motor or generator, the disk is also given a complimentary curvature so that its second surface will engage flush against the exterior surface of the enclosure wall. In other environments where the enclosure wall is substantially flat, the disk can be formed without its curvature so that its second surface will still engage flush against the flat wall of the enclosure.

With the second end of the grommet base inserted through the enclosure wall opening, the grommet is then turned counter-clockwise so that the tab surfaces slide across the interior of the enclosure wall and the disk second surface slides across the exterior surface of the enclosure wall surrounding the opening. Due to the tapered configuration of the tab surfaces between their first and second ends, as the grommet is turned and the tabs gradually move out of the notches in the opposite sides of the enclosure wall opening, the enclosure wall is held tightly between the disk second surface and the tab surfaces. The rotation is continued for one complete quarter turn at which point the pair of protrusions on the second surface of the disk will snap into the pair of notches at the opposite sides of the enclosure wall opening, thus completing the attachment of the grommet to the enclosure wall opening and securely holding the grommet to the enclosure wall.

The spiraled rib protrusions on the base exterior surface adjacent the base first end spiral around the exterior surface in a counter-clockwise direction as they extend from the first end toward the second end of the base. When a conduit is attached to the grommet to protect the electrical leads of the electrical device passing through the grommet, it is also turned in a counter-clockwise direction as it is threaded over the first end of the grommet base. Therefore, attaching a conduit to the first end of the grommet base will not act to loosen the connection of the grommet in the enclosure wall opening.

With its construction described above, the twist lock conduit connector grommet of the invention is easily attached to an enclosure wall opening without requiring the opening be positioned at an edge of the enclosure wall and without requiring additional fasteners. The grommet provides a secure seal over the enclosure wall opening and protects electrical leads of an electric device contained in the enclosure wall as they pass through the opening. It also provides a mechanism for attaching lengths of protective conduit to the grommet without additional fasteners and without potentially loosening the connection of the grommet to the enclosure wall opening.

DESCRIPTION OF THE DRAWINGS

Further objects and features of the present invention are revealed in the following detailed description of the preferred embodiment and in the drawings figures, wherein:

FIG. 1 is a perspective view of the first end of the twist lock conduit connector grommet of the invention and a portion of an enclosure wall to which the grommet is to be attached;

FIG. 2 is a perspective view of the second end of the grommet;

FIG. 3 is a front plan view of the grommet;

FIG. 4 is a rear plan view of the grommet;

FIG. 5 is a side elevation view of the grommet; and

FIG. 6 is a side elevation view of the grommet turned one-quarter turn from its position shown in FIG. 5.

DETAILED DESCRIPTION OF THE PREFERRED EMBODIMENT

The twist lock conduit connecting grommet 12 is shown positioned adjacent a portion of an enclosure wall 14 in FIG. 1. The opposite end of the grommet 12 that is actually connected to an opening 16 in the enclosure wall 14 is shown in FIG. 2. The grommet 12 is basically comprised of a tubular base 18 having a pair of locking tabs 22 at one end of the base, a sealing disk 24 on the exterior of the base and spaced axially from the tabs 24, a hex-nut 26 on the exterior of the base adjacent the disk 24, and a pair of protrusions or ribs 28 spiraling over the base adjacent the hex-nut 26. All of the component parts of the grommet are preferably formed as one piece from a rigid plastic material or other similar material. In the preferred embodiment, the material chosen for the grommet will give it sufficient rigidity while still permitting limited flexing movement of the disk and tabs as will be described.

The grommet 12 is designed to be easily attached to the opening 16 in the enclosure wall 14 by inserting an end of the grommet into the opening and then turning the grommet one-quarter turn. No separate fasteners are needed and it is not necessary that the opening in the enclosure wall be positioned at an edge of the wall as required by prior art grommets. As shown in FIG. 1, the opening 16 may be positioned at any convenient location in the enclosure wall 14 that would facilitate the passage of electrical conductors of the electrical device contained in the enclosure through the opening. In referring to FIG. 1, in the preferred embodiment the enclosure wall opening 16 for the grommet 12 has mutually perpendicular major 32 and minor 34 axes, with the major axis dimension of the opening being larger than the minor axis dimension of the opening. As shown in FIG. 1, the opening 16 has a circular center portion 36 with rectangular notches 38 formed in opposite sides of the center portion. The major axis 32 is measured across the opening between the far edges of the rectangular notches 38 and the minor axis is measured perpendicular to the major axis between opposite edges of the circular portion 36 of the opening. However, the opening 16 can have a different configuration than that shown and function equally well with the grommet 12. For example, the opening could have an oblong or elliptical configuration or other similar configuration with a major axis and minor axis.

The base portion 18 of the grommet has a generally cylindrical exterior surface 42. An interior bore is defined by a cylindrical interior surface 44 that passes through the base from a circular first end 46 of the base to a circular second end 48 of the base. The cylindrical interior surface 44 of the base interior bore has a center axis 52. The base exterior surface 42 has an exterior diameter that is just slightly smaller than the circular portion 36 of the enclosure wall opening.

The pair of protrusions or ribs 28 are formed on the base exterior surface 42 adjacent the base first end 46. At least two such protrusions 28 are formed on the exterior surface. The protrusions 28 begin adjacent the base first end 46 and spiral in a counter-clockwise direction around the base exterior surface 42 as they extend toward the base second end 48. In the preferred embodiment, each protrusion 28 has a triangular cross-section.

The hex-nut 26 extends around the base exterior surface 42 intermediate the base first 46 and second 48 ends. As is conventional, the hex-nut 46 is formed by six flat surfaces of equal size that are arranged end to end around the exterior of the base. The flat surfaces of the hex-nut permit the use of a wrench on the hex-nut when a mechanical advantage is need to turn the grommet in the enclosure wall opening. As an alternative to the hex-nut 26, the six surfaces could be replaced by four surfaces of a square nut or by a knurled surface as well as other types of surfaces that would provide a mechanical advantage in turning the grommet.

The disk 24 is positioned on the base exterior surface adjacent to the hex-nut 26 and intermediate the base first 46 and second 48 ends. As seen in the drawing FIGS., the disk 24 extends completely around the base and projects radially outwardly to a peripheral edge 54 of the disk. In the preferred embodiment, the disk peripheral edge 54 gives the disk an oblong configuration that is dimensioned sufficiently large to cover over and seal closed the opening 16 in the enclosure wall. The disk 24 could have other configurations that perform the sealing function depending on the configuration of the enclosure wall opening. The exterior diameter of the disk peripheral edge 54 is larger than the dimension of the major axis 32 of the enclosure wall opening 16. The disk has a first surface 56 that faces toward the first end 46 of the base and an opposite second surface 58 that faces toward the second end 48 of the base. In the embodiment of the grommet 12 that is to be attached to an enclosure wall 12 having a curved surface, for example the enclosure wall of a cylindrical electric motor shell, the disk 24 is also slightly curved so that its first surface is convex and its second surface is concave. The curvature of the disk second surface 58 is preferably determined to match the curvature of the enclosure wall 14 so that the second surface seats flush against the enclosure wall when the grommet is attached to the opening. In other environments where the enclosure wall is substantially flat, the disk 24 can be formed without its curvature so that its second surface 58 will still engage flush against the flat wall of the enclosure.

A pair of protrusions 62 project outwardly from the disk second surface 58 on diametrically opposite sides of the base 18. As seen in FIG. 4, the protrusions 62 are formed as straight ridges that extend across the disk second surface 58 parallel to each other. The protrusions 62 are spaced apart from each other a distance that is slightly smaller than the dimension of the enclosure wall opening major axis 32. In addition, the length of the protrusions 62 is slightly smaller than the width of the notches 38 at the opposite sides of the enclosure wall opening center portion 36.

The pair of locking tabs 22 project radially outwardly from diametrically opposite sides of the base exterior surface 42 adjacent the second end 48 of the base. Each of the tabs 22 projects outwardly from the base exterior surface to a distal end surface 64 of the tab. The distal ends 64 of the pair of tabs are spaced a distance apart that is slightly smaller than the dimension of the major axis 32 of the enclosure wall opening but is larger than the dimension of the minor axis 34 of the enclosure wall opening. Each of the tabs has a surface 66 that faces toward and is axially spaced from the second surface 58 of the disk. Each tab surface 66 is tapered slightly and has opposite first 68 and second 72 edges. The tab surfaces 66 taper gradually away from the disk second surface 58 as the tab surfaces extend from their first edges 68 to their second edges 72. Conversely, the tab surfaces taper gradually toward the second disk surface 58 as the tab surfaces extend from their second edges 72 to their first edges 68. Thus, the tab surfaces at the first edges 68 are closer to the disk second surface 58 than are the tab surfaces at the second edges 72. The axial spacing between the disk second surface 58 and each tab surface at their first edges 68 is slightly smaller than the thickness of the enclosure wall 14 to which the grommet is to be attached. The axial spacing between the disk second surface 58 and each tab surface at their second edges 72 is slightly larger than the thickness of the enclosure wall 14 to which the grommet is to be attached. The tab surface first edge 68 of one of the tabs is opposite the tab surface second edge 72 of the other tab, and the tab surface second edge 72 of the one tab is opposite the tab surface first edge 68 of the other tab.

In attaching the grommet 12 to the enclosure wall opening 16, it is first positioned with its second end 48 adjacent the opening 16 and with its pair of tabs 22 aligned with the major axis of the opening. The second end 48 of the grommet is then inserted through the circular portion 36 of the opening with the tabs 22 of the grommet passing through the rectangular notches 38 at the opposite sides of the opening. When the enclosure wall 14 has a slight curvature, for example in a cylindrical enclosure wall of an electric motor or generator, the disk 24 is also given a complimentary curvature so that its second surface 58 will engage flush against the exterior surface of the enclosure wall. In other environments where the enclosure wall is substantially flat, the disk can be formed without its curvature so that its second surface will still engage flush against the flat wall of the enclosure.

With the second end 48 of the grommet base inserted through the enclosure wall opening 16, the grommet 12 is then turned counter-clockwise so that the tab surfaces 66 slide across the interior of the enclosure wall and the disk second surface 58 slides across the exterior surface of the enclosure wall surrounding the opening. Due to the tapered configuration of the tab surfaces 66 between their first 68 and second 72 edges, as the grommet is turned and the tabs gradually move out of the notches 38 in the opposite sides of the enclosure wall opening, the enclosure wall is held tightly between the disk second surface 58 and the tab surfaces 66. The rotation is continued for one complete quarter turn at which point the pair of protrusions 62 on the second surface 58 of the disk will snap into the pair of notches 38 at the opposite sides of the enclosure wall opening, thus completing the attachment of the grommet to the enclosure wall opening and securely holding the grommet to the enclosure wall.

The spiraled rib protrusions 28 on the base exterior surface adjacent the base first end 46 spiral around the exterior surface in a counter-clockwise direction as they extend from the first end 46 toward the second end 48 of the base. When a conduit is attached to the grommet to protect the electrical leads of the electrical device passing through the grommet, it is also turned in a clockwise direction as it is threaded over the first end 46 of the grommet base. Therefore, attaching a conduit to the first end 46 of the grommet base will not act to loosen the connection of the grommet in the enclosure wall opening.

With its construction described above, the twist lock conduit connector grommet of the invention is easily attached to an enclosure wall opening without requiring the opening be positioned at an edge of the enclosure wall and without requiring additional fasteners. The grommet provides a secure seal over the enclosure wall opening and protects electrical leads of an electric device contained in the enclosure wall as they pass through the opening. It also provides a mechanism for attaching lengths of protective conduit to the grommet without additional fasteners and without potentially loosening the connection of the grommet to the enclosure wall opening.

While the present invention has been described by reference to a specific embodiment, it should be understood that modifications and variations of the invention may be constructed without departing form the scope of the invention defined in the following claims.

What is claimed:

1. A grommet for an enclosure wall having an opening therethrough, the grommet comprising:
    a tubular base having opposite first and second ends with an interior bore passing through the base between its first and second ends, the bore having a center axis;
    a disk extending around the base and projecting outwardly from the base between the base first and second ends;
    a tab projecting outwardly from the base adjacent the base second end, the tab having a surface that faces toward the disk, the tab surface has opposite first and second edges and the tab surface at the first edge is axially closer to the disk than the tab surface at the second edge.

2. The grommet of claim 1, wherein:
    the tab is one of a pair of tabs that project outwardly from opposite sides of the base adjacent the base second end, each tab having a surface that faces toward the disk and each tab surface has opposite first and second edges and the tab surfaces at the first edges are axially closer to the disk than the tab surfaces at the second edges.

3. The grommet of claim 2, wherein:
    the tab surfaces taper axially away from the disk as the tab surfaces extend from their first edges to their second edges.

4. The grommet of claim 1, wherein:
    the disk has opposite first and second surfaces, the first surface of the disk faces toward the base first end and the second surface of the disk faces toward the base second end and the tab surface, and the disk second surface is concave.

5. The grommet of claim 1, wherein:
    the disk has opposite first and second surfaces, the first surface of the disk faces toward the base first end and the second surface of the disk faces toward the base second end and the tab surface, and a protrusion extends axially outwardly from the disk second surface toward the base second end.

6. The grommet of claim 5, wherein:
    the protrusion is positioned on the disk second surface where it does not oppose the tab surface.

7. The grommet of claim 1, wherein:
    the base has an exterior surface between the disk and the base first end that is comprised of a plurality of flat surfaces arranged end-to-end around the base.

8. The grommet of claim 7, wherein:
    the plurality of flat surfaces includes six flat surfaces that form a hexagon around the base.

9. The grommet of claim 7, wherein:
    a protrusion projects outwardly from the base exterior surface for holding a conduit on the base exterior surface, the protrusion is positioned between the plurality of flat surfaces and the base first end.

10. The grommet of claim 1, wherein:
    the base first end is circular and the base second end is circular.

11. The grommet of claim 1 for an enclosure wall having an opening with a major axis and a minor axis, the major axis of the opening being larger than the minor axis of the opening, the grommet comprising:
    the disk having a peripheral edge with a diameteral dimension that is larger than the opening major axis.

12. The grommet of claim 11, wherein:
    the tab projects outwardly from the base to a distal end of the tab that is positioned at a first distance from the base center axis, and the first distance is greater than half of the opening minor axis.

13. A grommet for an enclosure having an enclosure wall with an opening therethrough, the opening having a major axis and a minor axis, the major axis having a dimension that is larger than a dimension of the minor axis, the grommet comprising:
    a tubular base having opposite first and second ends with an interior bore passing through the base between its first and second ends, the bore having a center axis;
    a disk extending around the base and projecting outwardly from the base between the base first and second ends; and
    a tab projecting outwardly from the base adjacent the base second end to a distal end of the tab, the tab distal end being spaced a first distance from the base center axis that is less than half of the enclosure wall opening major axis dimension and greater than half of the enclosure wall opening minor axis dimension.

14. The grommet of claim 13, wherein:
    the tab is one of a pair of tabs that project outwardly from opposite sides of the base adjacent the base second end, each tab has a distal end and the distal ends of the tabs are spaced from each other a second distance that is less than the enclosure wall opening major axis dimension and greater than the enclosure wall opening minor axis dimension.

15. The grommet of claim 14, wherein:

the disk has a peripheral edge with a diametrical dimension that is larger than the enclosure wall opening major axis dimension.

16. The grommet of claim 13, wherein:

the disk has opposite first and second surfaces, the first surface of the disk faces toward the base first end and the second surface of the disk faces toward the base second end and the tab surface, and the disk second surface is concave.

17. The grommet of claim 14, wherein:

the disk has opposite first and second surfaces, the first surface of the disk faces toward the base first end and the second surface of the disk faces toward the base second end, and a pair of protrusions extend axially outwardly from the disk second surface on opposite sides of the base.

18. The grommet of claim 17, wherein:

the pair of protrusions are positioned on the disk second surface where they do not oppose the pair of tabs.

19. The grommet of claim 13, wherein:

the tab has a surface that faces toward the disk and the surface has opposite first and second edges, the tab surface at the first edge is axially closer to the disk than the tab surface at the second edge.

20. The grommet of claim 13, wherein:

the base has an exterior surface between the disk and the base first end that is comprised of a plurality of flat surfaces arranged end-to-end around the base.

* * * * *